United States Patent

Johnson

[11] Patent Number: 5,999,801
[45] Date of Patent: Dec. 7, 1999

[54] WIRELESS RECHARGEABLE CB MICROPHONE

[76] Inventor: Jason R. Johnson, P.O. Box 1423, Gainesville, Tex. 76241

[21] Appl. No.: 08/933,507

[22] Filed: Sep. 18, 1997

[51] Int. Cl.$^6$ ................................................. H04Q 7/32
[52] U.S. Cl. ........................... 455/92; 455/90; 455/575; 455/346; 455/347; 455/573; 379/433; 379/428; 381/365
[58] Field of Search ................................. 455/92, 90, 575, 455/344, 346, 347, 573, 550; 379/433, 428; 381/365

[56] References Cited

U.S. PATENT DOCUMENTS 4,363,935  12/1982  Toya ........................................... 455/92
4,876,710  10/1989  Reed et al. ................................. 455/462

Primary Examiner—Wellington Chin
Assistant Examiner—Keith Ferguson
Attorney, Agent, or Firm—John E. Vandigriff

[57] ABSTRACT

The invention is a wireless microphone unit for use with a transmitter such as a CB transmitter. The microphone unit transmitted the voice signal to a receiver unit that is attached to the transmitter via a standard microphone connector that a corded microphone would be attached to. The microphone unit may be attached to a mounting unit not in use. The mounting unit and microphone unit have mating electrical connectors that charge a battery in the microphone unit when the microphone unit is mounted in the mounting unit.

11 Claims, 4 Drawing Sheets

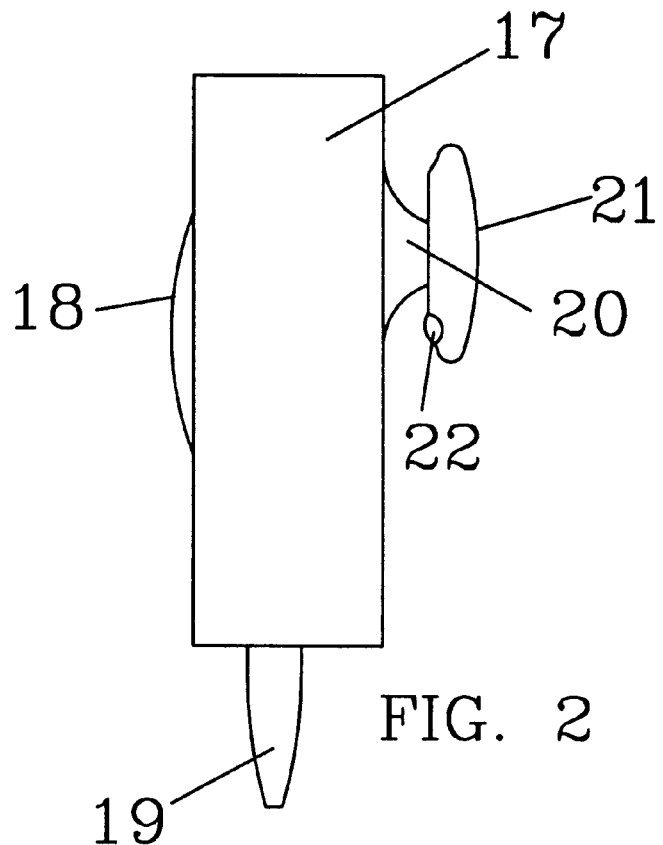
FIG. 2
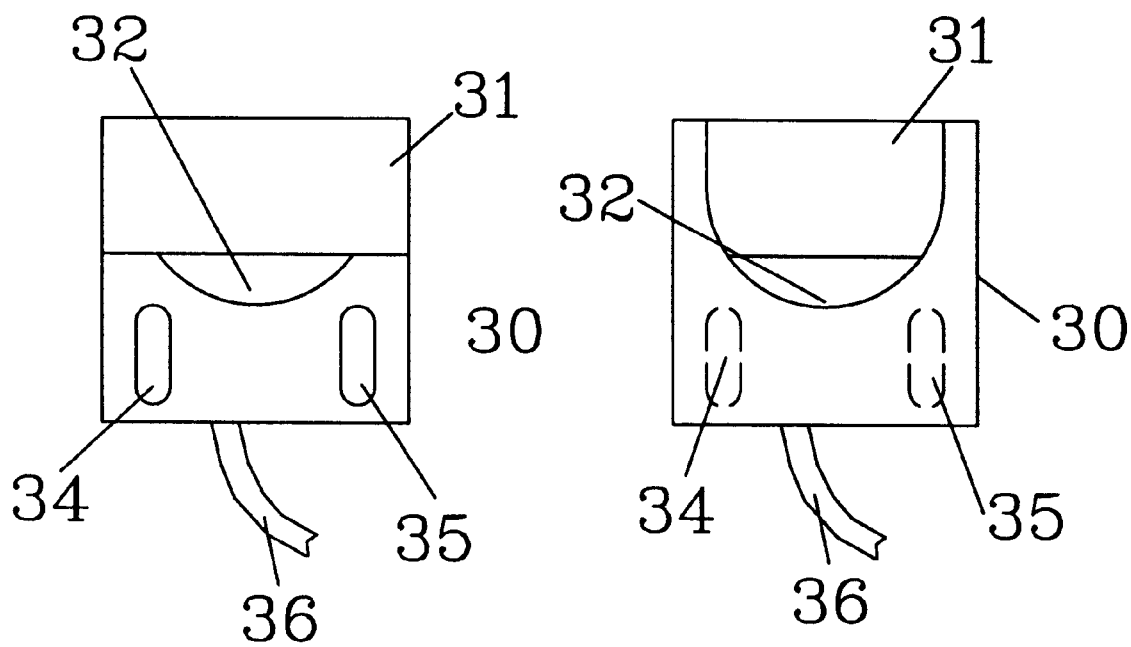
FIG. 3
FIG. 4

WIRELESS RECHARGEABLE CB MICROPHONE

FIELD OF THE INVENTION

This invention relates to microphones, and more particularly to a rechargeable wireless microphone for mobile transmitting equipment.

BACKGROUND OF THE INVENTION

Wireless microphones have been used with audio equipment to allow a performer to utilize an amplification system without having to have the microphone attached to an audio amplifier by a wire. This gives the performer freedom to move about. Examples of such wireless microphones are shown in U.S. Pat. Nos. 3,718,862, 4,344,184 and 4,815,143. The power source in each of these examples is not specified, but are presumed to be replaceable batteries.

Citizen Band (CB) radios usually have a receiver/transmit unit and a microphone attached to the receiver/transmit unit by a cable that has a connector that attaches to a mating connector on the receive/transmit unit. The cord often can become entangled, especially when the unit is mounted in a truck or automobile, and does not give the driver/CB operator freedom of using the CB radio and microphone without a cord. Cordless microphones found in the prior art are generally not suitable since extended use on a highway by a truck driver will require frequent replacement of batteries, which is not a desirable situation.

SUMMARY OF THE INVENTION

The invention is a wireless microphone unit for use with a transmitter such as a CB transmitter. The microphone unit transmitted the voice signal to a receiver unit that is attached to the transmitter via a standard microphone connector that a corded microphone would be attached to. The microphone unit may be attached to a mounting unit when not in use. The mounting unit and microphone unit have mating electrical connectors that charge a battery in the microphone unit when the microphone unit is mounted in the mounting unit.

The technical advance represented by the invention as well as the objects thereof will become apparent from the following description of a preferred embodiment of the invention when considered in conjunction with the accompanying drawings, and the novel features set forth in the appended claims.

BRIEF DESCRIPTION OF THE DRAWINGS

FIG. 2 is a side view of the microphone unit;

FIG. 3 is a back view of the microphone mount/charger unit;

FIG. 4 is a front view of a microphone mount/charger unit;

DESCRIPTION OF A PREFERRED EMBODIMENT

Figure 1:
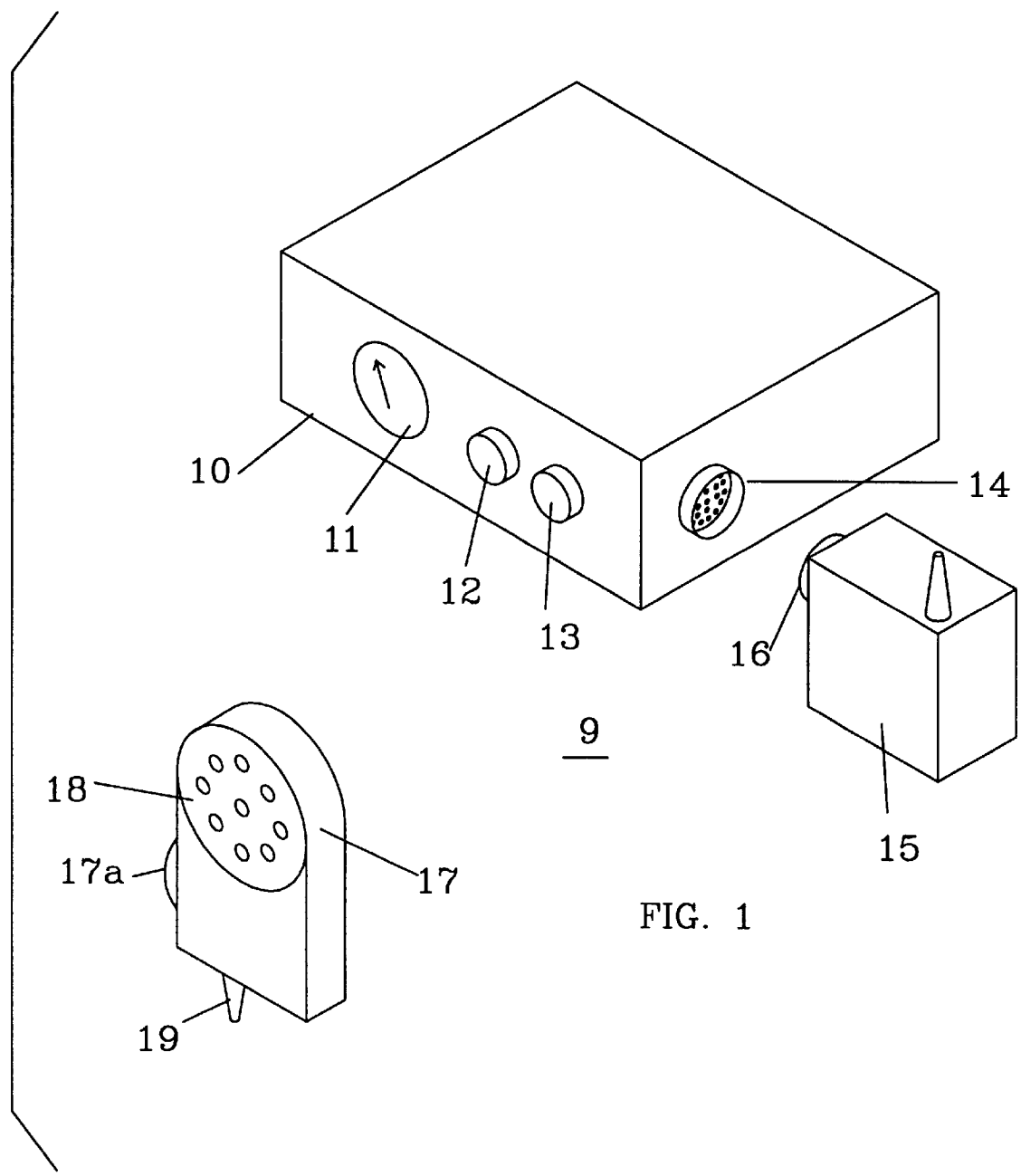
FIG. 1 shows a transmit/receiver unit with a microphone and microphone receiver unit.

The invention is to a communication system 9 including a wireless microphone 18, a transmitter/receiver 10, and a receiver/audio unit 15 that connects microphone 17 to receiver/transmitter 10. FIG. 1, for example, shows a CB radio/transmitter 10 that includes control knobs 12 and 13, such as ON/OFF and audio volume control knob 12 and channel switch 13. Meter 11 shows signal strength. Connector 14 is for connecting either a corded microphone or a received/audio unit 15. Receive/audio unit 15 connects via connector 16 to connector 14 on receiver/transmitter 10. Unit 17 includes a microphone 18, transmitter circuit 40 (FIG. 7), and antenna 19 that transmits the voice modulation to receiving unit 15. Switch 17a is the transmit switch which is depressed when speaking into the microphone. Unit 15, connected to unit 10, supplies the voice signal from microphone 18.

By utilizing the transmitter in unit 17 and receiver in unit 15, microphone 18 can be portable and does not have to be connected to the CB 10 by a cord. The transmitter and receiver may be an FM transmitter/receiver combination and can be low powered so that the microphone may be used several feet from the CB and still supply voice modulation to the CB. A standard CB may be used, using a separately supplied unit 15 and 17.

FIG. 2 is a side view of unit 17 showing microphone 18, antenna 19, and a combination mounting stud with standoff 20 and disk 21 which has electrical connections 22 (only one shown) mounted thereon that permits unit 17 to be attached to a mounting surface while receiving a charging voltage through the connections 22. Switch 17b removes power from unit 17 when not in use, but allows a battery in unit 17 to be charged when mounted in mounting bracket 30, described below.

FIG. 3 is a back view of mounting bracket 30 which includes mounting tab 31, opening 32 into which mounting disk 21 is inserted, and contacts 34 and 35 which contact connections 22 to supply charging voltage to unit 17. Power is supplied to mounting bracket 30 by wires 36.

FIG. 4 is a front view of mounting bracket 30 showing mounting tab 31 and opening 32. Contacts 34 and 35, on the back side of mount 30 are shown in dashed lines.

Figure 5:
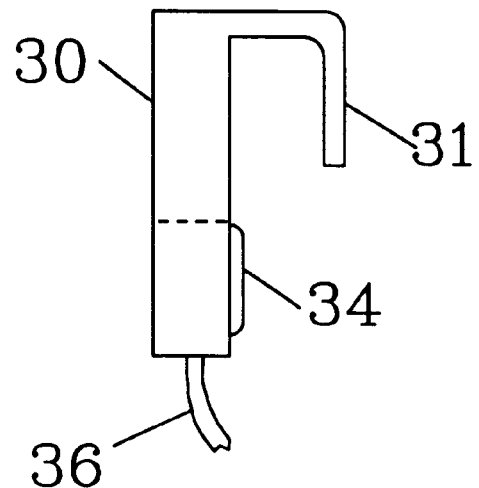
FIG. 5 is a side view of the microphone mount/charger unit.

FIG. 5 is a side view of mounting bracket 30, showing mounting tab extending away from bracket 20 allowing mounting stud (FIG. 2) to hold unit 17 in place in bracket 30. Contacts 34 and 35 (only contact 34 shown) are connected to conductor 36.

Figure 6:
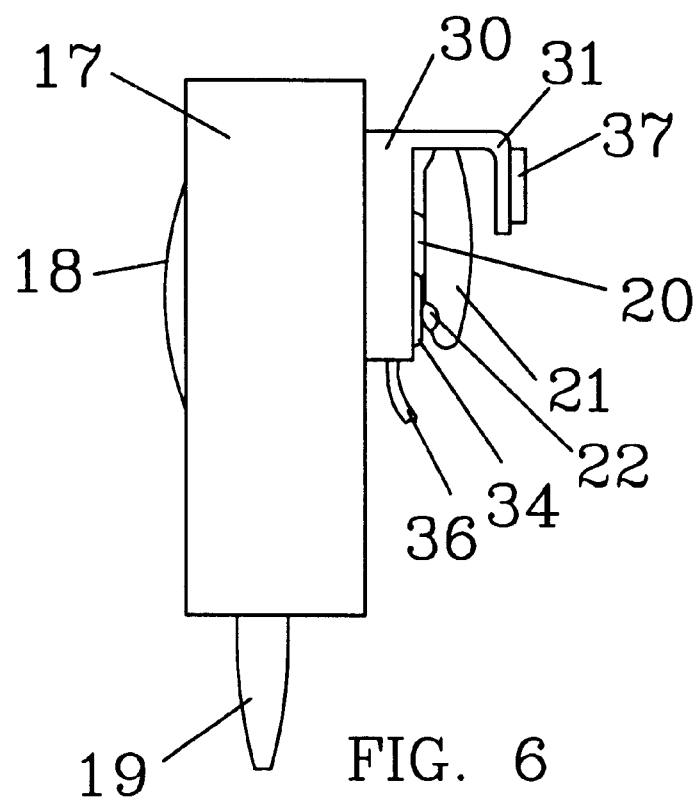
FIG. 6 is a side view showing the microphone mounted on the microphone mount/charger unit.

FIG. 6 shows unit 17 mounted in bracket 30. Disk 21 on standoff 20 is held in bracket 30 holding contacts 34 and 35 in electrical contact with connections 22. Mounting tab 31 may be secured to a surface using device 37 which may be any one of screws, double sided tape, or a hook and loop fastener. Wire 36 supplies power to unit 17 via contacts 34, 35 and 22.

Figure 7:
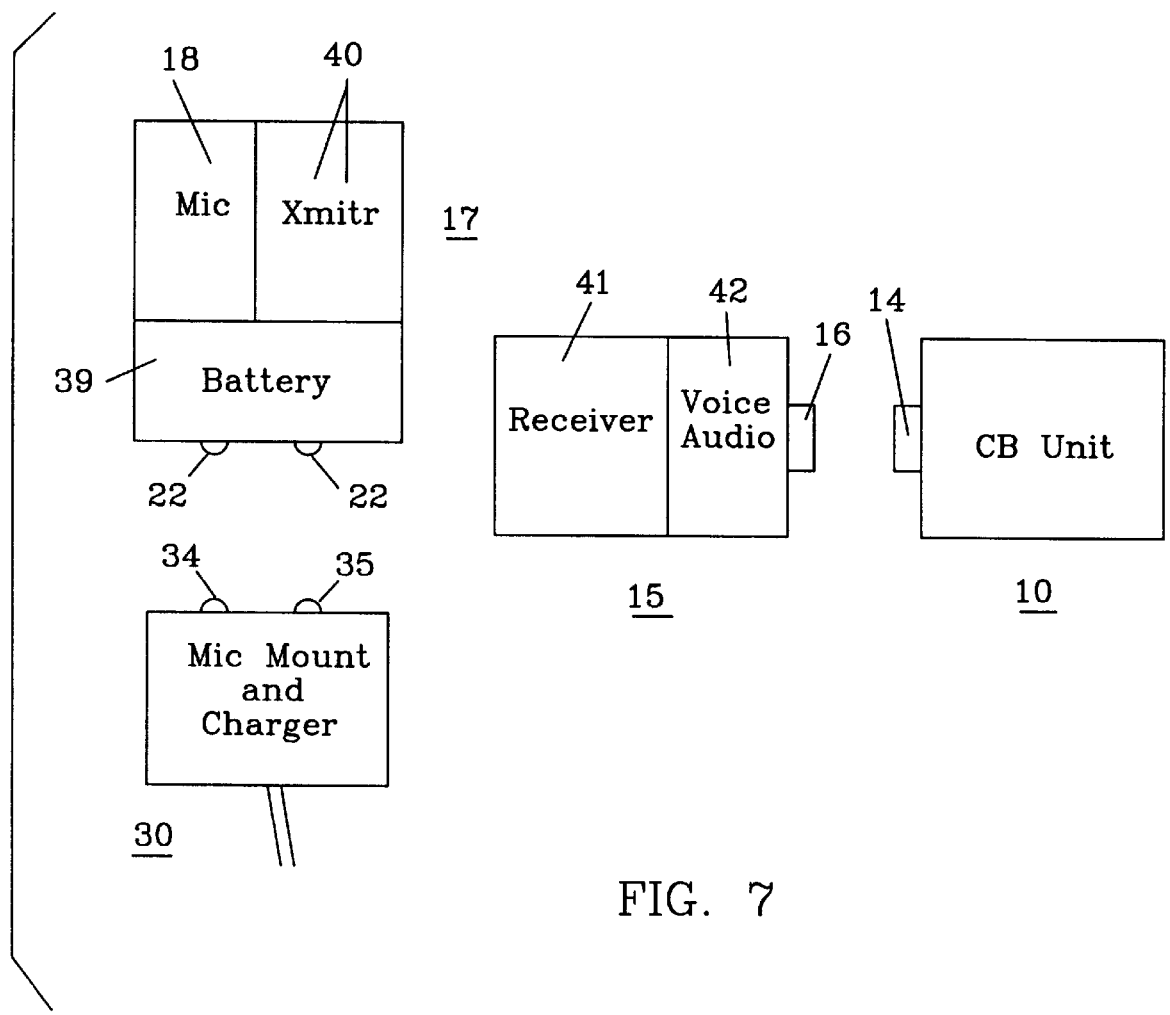
FIG. 7 is a block diagram showing the functional components of the microphone and microphone receiver unit.

FIG. 7 shows the overall operation of the wireless microphone unit 17, mounting bracket 30, receiver/audio unit 15 and CB unit 10. Unit 17 houses microphone 18 which supplies audio to transmitter 40, which transmits the voice audio 42 to receiver 41 in unit 15. The signal received by unit 15 is demodulated to provide the voice audio that is sent to CB unit 10.

Mounting bracket 30 supplies a charging voltage to battery 39 when unit 17 is held in mounting bracket 30. When unit 17 is removed from mounting bracket 30, battery 39 powers microphone 18 and transmitter 40, to provide the voice modulation signal to CB transmitter. The absence of a connecting cord between microphone 18 and CB 10 provides freedom of movement of the CB operator while the charging connection of the microphone in mounting bracket 30 ensures that the microphone 18 will be available for use when desired.

What is claimed:

1. A cordless microphone system in combination with a transmitter unit, comprising:

a transmitting unit having an input connector for connecting a microphone;

a microphone unit including a microphone, battery, and a transmitter circuit for transmitting voice signals from the microphone; and a receiving unit with a connector for connecting to the transmitting unit microphone input connector, said receiving unit receiving the transmitted voice signals and inputting the voice signal into the transmitting unit.

2. The cordless microphone system according to claim 1, wherein said microphone unit has a pair of contacts for charging said battery.

3. The cordless microphone system according to claim 1, including a mounting device for mounting the microphone when not in use, said mounting unit having a pair of contacts thereon for charging the battery in the microphone unit when the microphone unit is attached to the mounting device.

4. The cordless microphone system according to claim 1, wherein said battery is a rechargeable battery.

5. The cordless microphone system according to claim 1, including an ON/OFF switch which removes power from the microphone unit, but not from the battery mounted therein.

6. The cordless microphone system according to claim 1, wherein said microphone unit has a mounting device thereon, and said mounting device has two electrical contacts thereon for charging the battery in the microphone unit.

7. A cordless microphone system in combination with a transmitter unit, comprising:

a transmitting unit having an input connector for connecting a microphone;

a microphone unit including a microphone, battery, a mounting device, and transmitter circuit for transmitting voice signals from the microphone; and a receiving unit with a connector for connecting to the transmitting unit microphone input connector, said receiving unit receiving the transmitted voice signals and inputting the voice signal into the transmitting unit.

8. according to claim 7, wherein said mounting device includes a pair of contacts for charging said battery when the microphone unit is attached to the mounting device.

9. The cordless microphone system according to claim 7, wherein said battery is a rechargeable battery.

10. The cordless microphone system according to claim 7, including an ON/OFF switch which removes power from the microphone unit, but not from the battery mounted therein.

11. The cordless microphone system according to claim 7, wherein said microphone unit has a mounting device thereon, and said mounting device has two electrical contacts thereon for charging the battery in the microphone unit.

\* \* \* \* \*